(12) United States Patent
Sato et al.

(10) Patent No.: US 10,826,045 B2
(45) Date of Patent: Nov. 3, 2020

(54) BATTERY WIRING MODULE

(71) Applicant: Sumitomo Wiring Systems, Ltd., Mie (JP)

(72) Inventors: Hiroshi Sato, Mie (JP); Ryota Mori, Mie (JP)

(73) Assignee: SUMITOMO WIRING SYSTEMS, LTD, Yokkaichi (JP)

( * ) Notice: Subject to any disclaimer, the term of this patent is extended or adjusted under 35 U.S.C. 154(b) by 232 days.

(21) Appl. No.: 15/963,231

(22) Filed: Apr. 26, 2018

(65) Prior Publication Data

US 2018/0315978 A1    Nov. 1, 2018

(30) Foreign Application Priority Data

Apr. 28, 2017   (JP) ................. 2017-090476

(51) Int. Cl.
*H01M 2/20*      (2006.01)
*H01M 10/42*     (2006.01)
*H01M 2/10*      (2006.01)

(52) U.S. Cl.
CPC ......... *H01M 2/206* (2013.01); *H01M 2/1077* (2013.01); *H01M 10/425* (2013.01); *H01M 2220/20* (2013.01)

(58) Field of Classification Search
CPC ........... H01M 10/425; H01M 2220/20; H01M 2/1077; H01M 2/206
See application file for complete search history.

(56) References Cited

U.S. PATENT DOCUMENTS

2014/0311768 A1\* 10/2014 Takishita ............. H01R 13/447
174/66
2016/0133907 A1   5/2016 Shitamichi et al.

FOREIGN PATENT DOCUMENTS

WO    WO-2014203713 A1 \* 12/2014  ........... H01M 2/206

\* cited by examiner

*Primary Examiner* — Victoria H Lynch
(74) *Attorney, Agent, or Firm* — Reising Ethington, P.C.

(57) ABSTRACT

A battery wiring module that can improve workability when covers are to be opened. A cover includes a cover body portion coupled to a housing so as to be pivotable between a closed position and an open position, and a cover lock portion locked to a housing lock portion when the cover body portion is at the closed position. The housing lock portion includes an elastic piece located so as to face an outer surface of a fourth wall portion of the wiring housing portion, and is elastically deformable in a direction away from and a direction toward the fourth wall portion, and a lock protrusion that protrudes from the elastic piece in the direction toward the fourth wall portion. The cover lock portion is locked to the lock protrusion in the state of being inserted between the fourth wall portion and the elastic piece.

4 Claims, 4 Drawing Sheets

BATTERY WIRING MODULE

CROSS REFERENCE TO RELATED APPLICATIONS

This application claims the priority of Japanese patent application JP2017-090476 filed on Apr. 28, 2017, the entire contents of which are incorporated herein.

TECHNICAL FIELD

The present invention relates to a battery wiring module that is to be attached to a high-voltage secondary battery for a vehicle.

BACKGROUND ART

For example, as disclosed in JP 2015-2164A, a battery wiring module is attached to a high-voltage secondary battery that is mounted on a vehicle such as an electric vehicle or a hybrid vehicle as a power supply for the vehicle to travel. A battery wiring module includes: wiring that includes, for example, bus bars that are to be connected to connection terminals that extend from a secondary battery, and electrical wires that are connected to the bus bars; a housing that includes wiring housing portions that house the wiring; and a cover for closing openings of the wiring housing portions.

For example, a detection line cover of the battery wiring module disclosed in JP 2015-2164A, which is the cover for closing the wiring housing portion, is provided on the housing so as to be pivotable between a closed position at which the detection line cover covers the opening of a detection line routing groove that is included in the wiring housing portion, and an open position at which the detection line cover does not cover the opening. The detection line cover includes a cover lock portion that is locked to a housing lock portion that is formed so as to protrude from a side wall that defines the detection line routing groove to the outside of the routing groove, and the detection line cover is held at the closed position when the housing lock portion and the cover lock portion are locked to each other.

JP 2015-2164A is an example of related art.

SUMMARY

In a battery wiring module such as that described above, in order to open the cover (the detection line cover), it is necessary to unlock the cover lock portion and the housing lock portion from each other from above the cover because the secondary battery is attached to the lower side of the battery wiring module. However, with the above-described configuration, the cover lock portion extends downward from a body portion of the cover that covers the wiring housing portion, and therefore it is difficult to perform an operation from above the cover to separate the cover lock portion from a side wall of the wiring housing portion and unlock the cover lock portion from the housing lock portion.

The present design has been made to solve the above-described problem, and aims to provide a battery wiring module that can improve workability when the cover is to be opened.

A battery wiring module that solves the above-described problem is a battery wiring module including: wiring that is to be electrically connected to an on-board secondary battery; a housing that is to be attached to the secondary battery and includes a wiring housing portion that houses the wiring; and a cover that includes a cover body portion that is coupled to the housing so as to be pivotable between a closed position at which the cover body portion closes an opening of the wiring housing portion and an open position at which the cover body portion does not close the opening, and a cover lock portion that extends from the cover body portion and is locked to a housing lock portion when the cover body portion is at the closed position, the housing lock portion being provided on the housing. The housing lock portion includes an elastic piece that is located so as to face an outer surface of a side wall of the wiring housing portion, and is elastically deformable in a direction away from and a direction toward the side wall, and a lock protrusion that protrudes from the elastic piece in the direction toward the side wall, and the cover lock portion is locked to the lock protrusion in a state of being inserted between the side wall and the elastic piece.

With this configuration, the housing lock portion is locked to the cover lock portion at a position on the outer side (the side that is located farther from the wiring housing portion than the other side is) of the cover lock portion. Therefore, it is easier to touch the housing lock portion from above the cover, and it is easier to unlock the housing lock portion from the cover lock portion by performing an operation from above the cover to elastically deform the housing lock portion. Thus, it is possible to improve workability when the cover is to be opened.

In the above-described battery wiring module, the housing is provided with a restriction wall portion that faces an outer surface of the side wall, the cover lock portion is located between the side wall and the restriction wall portion when the cover lock portion is in a state of being locked to the lock protrusion, and the restriction wall portion restricts the cover lock portion from moving in a direction to deform the elastic piece in the direction away from the side wall.

With this configuration, the restriction wall portion prevents the cover lock portion from moving in a direction to deform the elastic piece of the housing lock portion in the direction away from the side wall of the wiring housing portion. Therefore, when an external force is applied to the cover, it is possible to prevent the lock protrusion of the housing lock portion and the cover lock portion from being unintentionally unlocked from each other.

In the above-described battery wiring module, the restriction wall portion is provided with a first protruding portion that protrudes toward the side wall.

With this configuration, when the cover lock portion comes into contact with the restriction wall portion due to a dimension error or the like, the restriction wall portion comes into contact with the cover lock portion at the first protruding portion. Therefore, it is possible to reduce the contact area between the cover lock portion and the restriction wall portion. Consequently, it is possible to reduce resistance (a frictional force) that is generated when the cover is opened and closed, as much as possible.

In the above-described battery wiring module, the side wall restricts the cover lock portion from moving in a direction in which the lock protrusion protrudes.

With this configuration, the side wall of the wiring housing portion restricts the covering lock portion from moving in the direction in which the lock protrusion protrudes. Therefore, when an external force is applied to the cover, it is possible to prevent the lock protrusion of the housing lock portion and the cover lock portion from being unintentionally unlocked from each other.

In the above-described battery wiring module, the side wall is provided with a second protruding portion that protrudes toward the cover lock portion that is in a state of being locked to the housing lock portion.

With this configuration, when the cover lock portion comes into contact with the side wall of the wiring housing portion due to a dimension error or the like, the side wall comes into contact with the cover lock portion at the second protruding portion. Therefore, it is possible to reduce the contact area between the cover lock portion and the side wall. Consequently, it is possible to reduce resistance (a frictional force) that is generated when the cover is opened and closed, as much as possible.

The battery wiring module according to the present design can improve workability when a cover is to be opened.

EMBODIMENTS

Figure 1:
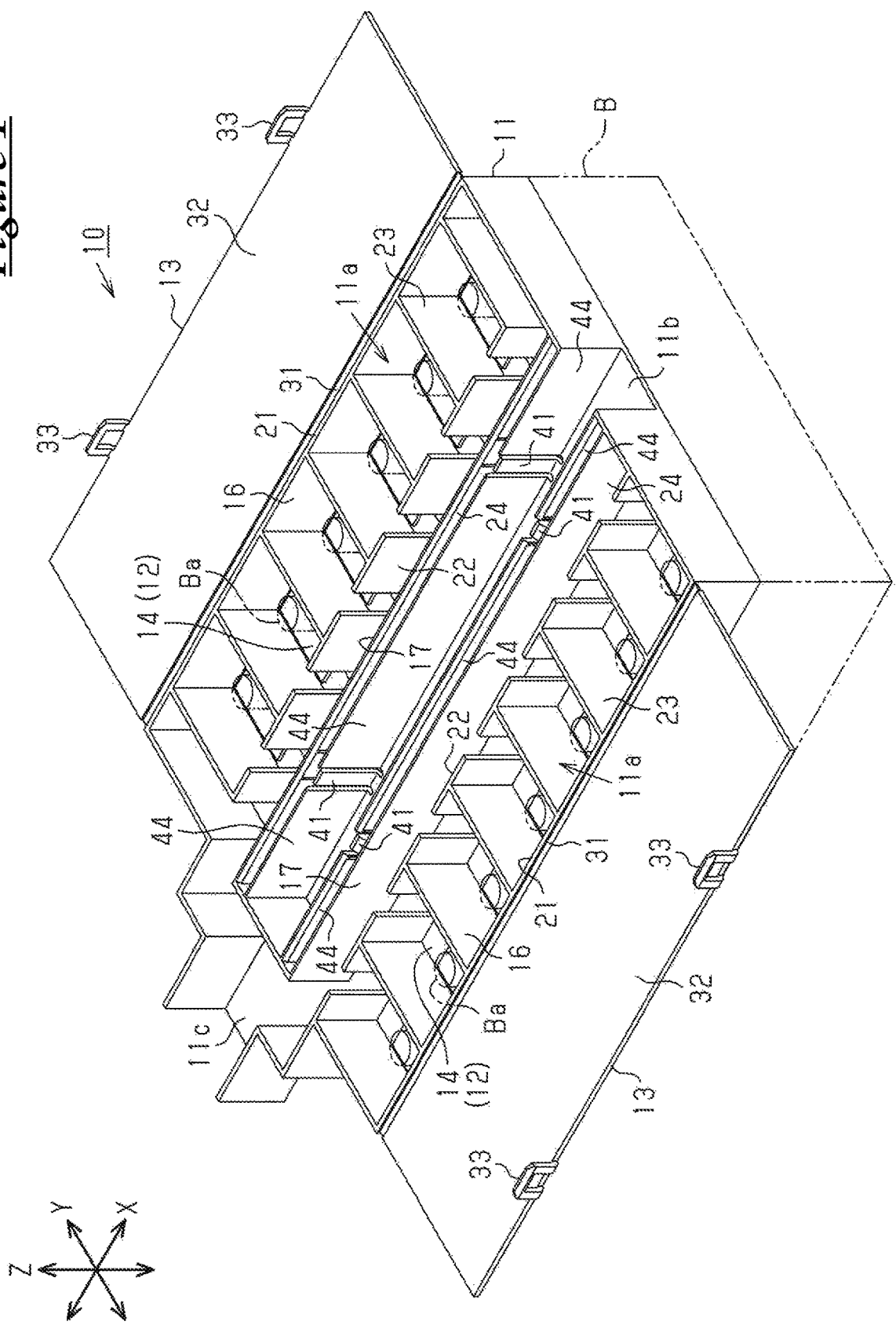
FIG. 1 is a perspective view of a battery wiring module according to an embodiment.

The following describes an embodiment of a battery wiring module with reference to FIGS. 1 to 5. In the following description, three directions that are orthogonal to each other (X, Y, and Z in the drawings) are described as a depth direction X, a width direction Y, and a height direction Z of the battery wiring module, respectively. In the drawings, some portions of components may be exaggerated or simplified for convenience of explanation. In addition, the dimensional ratio of each part may differ from the actual size.

A battery wiring module 10 according to the present embodiment shown in FIG. 1 is to be attached to a high-voltage on-board secondary battery B that is mounted on a vehicle such as an electric vehicle or a hybrid vehicle. The secondary battery B supplies power to a motor for the vehicle to travel (not shown), and is charged using power generated by a motor or a generator, according to the charge state. The secondary battery B is configured as, for example, a battery module formed by stacking a plurality of plate-shaped batteries in the depth direction X. One end of the secondary battery B in the depth direction X is formed as a positive electrode side, and the other end in the depth direction X is formed as a negative electrode side.

Figure 2:
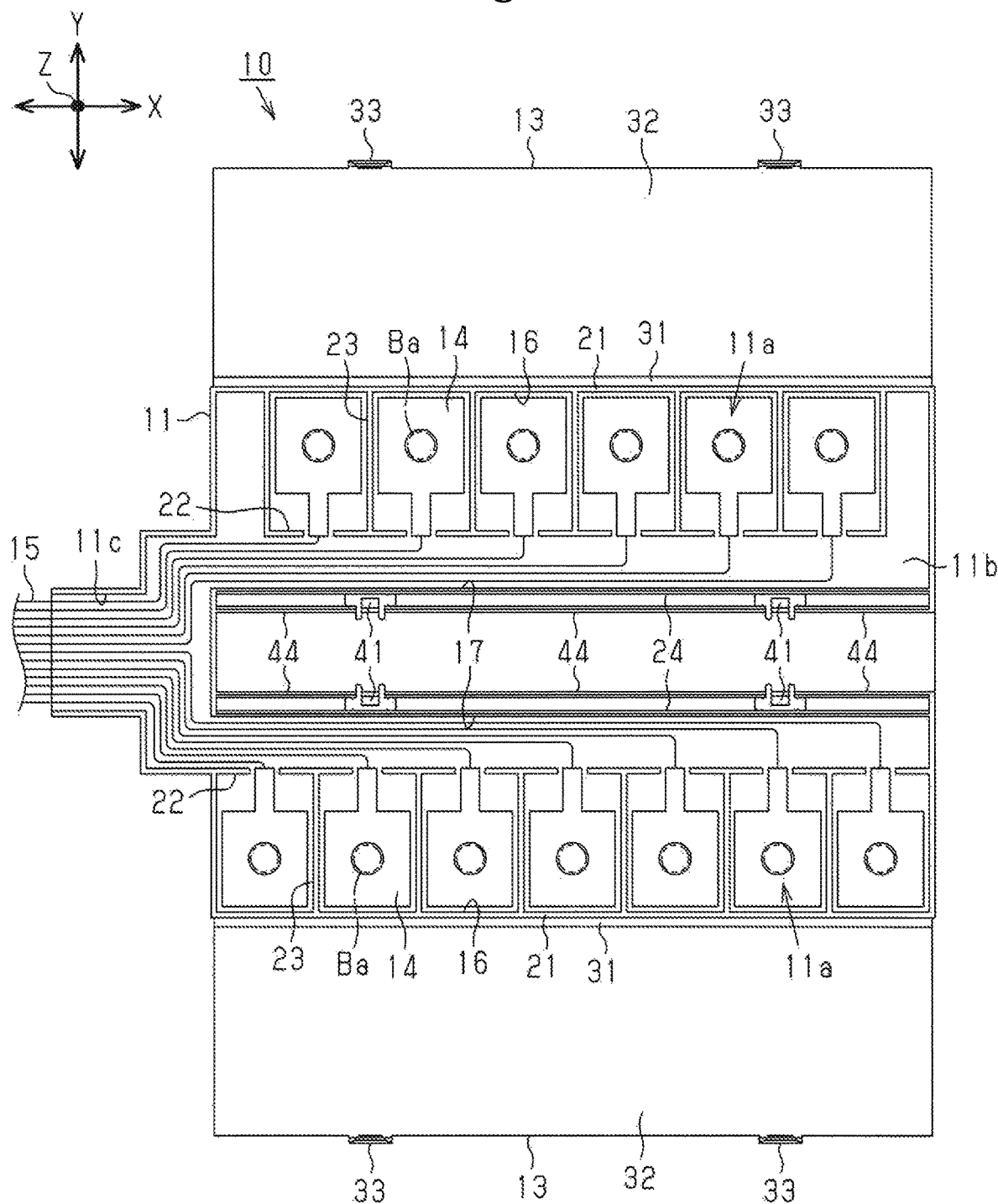
FIG. 2 is a plan view of the battery wiring module according to the embodiment.

As shown in FIGS. 1 and 2, the battery wiring module 10 includes a housing 11 that is attached to an upper portion of the secondary battery B and includes wiring housing portions 11a, wiring 12 that is housed in the wiring housing portions 11a and is electrically connected to the secondary battery B, and a pair of covers 13 for closing the upper openings of the wiring housing portions 11a. Note that the housing 11 and the covers 13 in the present embodiment are formed integrally with each other through injection molding using a synthetic resin material.

The wiring 12 in the present embodiment includes a plurality of flat plate-shaped bus bars 14 that are connected to electrodes Ba of the secondary battery B, and a plurality of electrical wires 15 (see FIG. 2) that are connected to the bus bars 14. Note that the electrical wires 15 are omitted from FIG. 1. The plurality of plate-shaped batteries included in the secondary battery B are connected to each other in series via the bus bars 14.

Each wiring housing portion 11a of the housing 11 includes a plurality of bus bar housing portions 16 for housing the plurality of bus bars 14, and electrical wire housing portions 17 for housing the electrical wires 15. The bus bar housing portions 16 and the electrical wire housing portions 17 are defined by wall portions that stand upright on a bottom portion 11b of the housing 11 so as to extend upward. The bus bar housing portions 16 and the electrical wire housing portions 17 are open upward (in a direction away from the secondary battery).

The plurality of bus bar housing portions 16 are arranged side by side in two rows in the depth direction X. The bus bars 14 are housed in the bus bar housing portions 16. The electrodes Ba of the secondary battery B penetrate through the bus bar housing portions 16 and the bus bars 14 in the height direction Z. The electrodes Ba and the bus bars 14 are electrically connected to each other by being fastened to each other using bolts (not shown), or by being welded to each other.

Each bus bar housing portion 16 is defined in the width direction Y by a first wall portion 21 and a second wall portion 22 that extend upward from the bottom portion 11b of the housing 11 and face each other in the width direction Y. Note that each first wall portion 21 is formed at an end portion of the housing 11 in the width direction Y, and constitutes a portion of an outer peripheral wall of the housing 11. Also, in the depth direction X, each bus bar housing portion 16 is defined by a plurality of third wall portions 23 that extend upward from the bottom portion 11b of the housing 11 and are arranged side by side in the depth direction X.

The electrical wire housing portions 17, in which the electrical wires 15 connected to the bus bars 14 are housed, are formed on the inner side of the rows of the bus bar housing portions 16 in the width direction Y. Each electrical wire housing portion 17 extends in the depth direction X, and is adjacent to one of the rows of bus bar housing portions 16.

Figure 4:
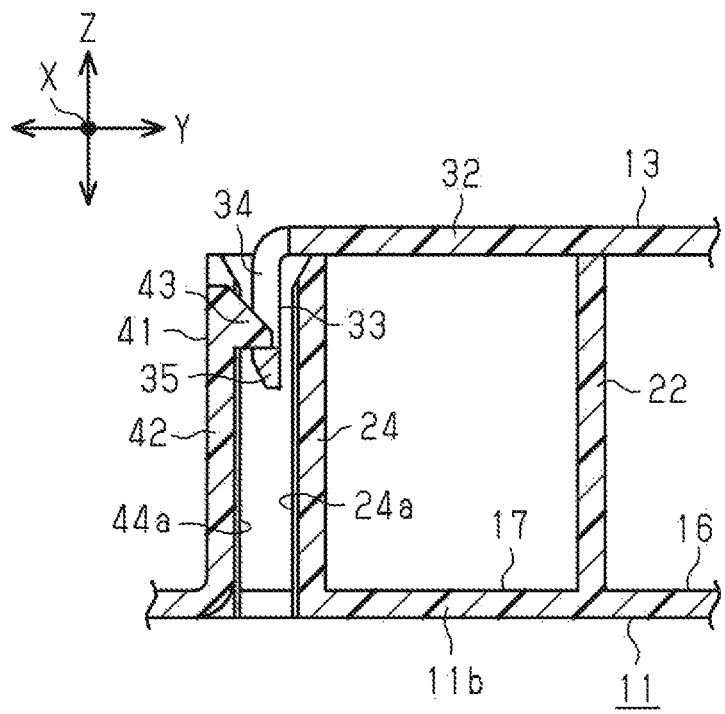
FIG. 4 is a cross-sectional view of the battery wiring module according to the embodiment.

Specifically, as shown in FIGS. 1 and 4, the electrical wire housing portions 17 are defined by fourth wall portions 24 that stand upright on the bottom portion 11b of the housing 11 to extend upward, and the second wall portions 22. That is, the fourth wall portions 24 constitute side walls of the electrical wire housing portions 17. The second wall portions 22 separate the bus bar housing portions 16 and the electrical wire housing portions 17 from each other. The fourth wall portions 24 have the shape of a flat plate extending in the depth direction X (a flat plate shape that is orthogonal to the width direction Y), and face the second wall portions 22 in the width direction Y.

As shown in FIG. 2, the electrical wires 15 connected to the bus bars 14 are routed to an electrical wire lead-out portion 11c of the housing 11 via the electrical wire housing portions 17. End portions of the electrical wires 15 led out of the electrical wire lead-out portion 11c are connected to connector portions (not shown), for example. The connector portions are connected to, for example, an ECU (electronic control unit) for charging control, which is mounted on a vehicle.

As shown in FIGS. 1 and 2, the pair of covers 13 are coupled to the housing 11 so as to be pivotable. One of the covers 13 is for covering one of the rows of bus bar housing portions 16 and the electrical wire housing portion 17 that is adjacent to the row of the bus bar housing portions 16. The other of the covers 13 is for covering the other of the rows of bus bar housing portions 16 and the electrical wire housing portion 17 that is adjacent to the row of the bus bar housing portions 16.

Each cover 13 includes: a flat plate-shaped cover body portion 32 that is pivotably coupled to an upper end of one of the first wall portions 21 located at the two ends of the housing 11 in the width direction Y, using a hinge 31; and a pair of cover lock portions 33 that are provided on a leading edge of the cover body portion 32 (the edge that is located farther from the hinge 31 than the other edge is). The cover body portion 32 has a rectangular shape, and is configured to cover the bus bar housing portions 16 arranged in a row in the depth direction X and the electrical wire housing portion 17 that is adjacent to the row of bus bar housing portions 16 from above all at once. Note that the hinge 31 is formed integrally with the first wall portion 21 and the cover body portion 32, and is a flexible portion that has a smaller plate thickness than the first wall portion 21 and the cover body portion 32. The cover body portion 32 is pivotable about the hinge 31 (a pivot axis that extends in the depth direction X) between an open position shown in FIG. 1 and so on and a closed position (see FIGS. 3 and 4) at which the cover body portion 32 covers a wiring housing portion 11a (bus bar housing portions 16 and an electrical wire housing portion 17) from above.

As shown in FIG. 4, the cover body portion 32 is orthogonal to the height direction Z when the cover body portion 32 is at a closed position (in a closed state) to cover the bus bar housing portions 16 and the electrical wire housing portion 17 from above. In this closed state, the cover body portion 32 faces a second wall portion 22 and a fourth wall portion 24 of the housing 11 in the height direction Z.

Figure 3:
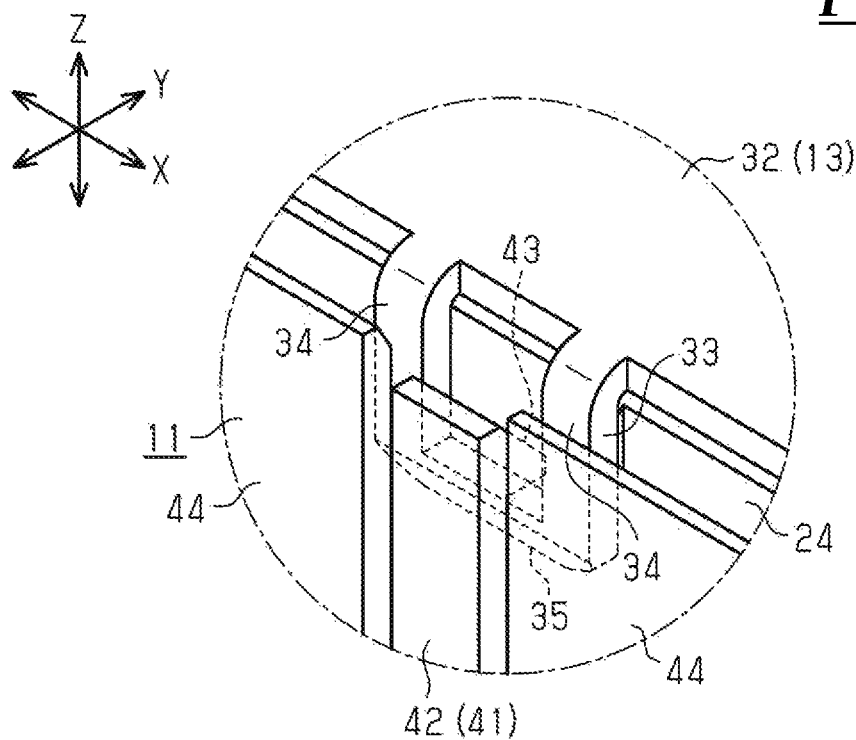
FIG. 3 is a partially enlarged perspective view of the battery wiring module with a cover that is in a closed state.

As shown in FIGS. 3 and 4, each of the cover lock portions 33 that are formed integrally with the cover body portion 32 has a substantially U-like frame shape. Specifically, each cover lock portion 33 includes a pair of extension portions 34 that extend downward from a leading edge of the cover body portion 32 that is in a closed state, and a lower end coupling portion 35 that connects the lower ends of the pair of extension portions 34 to each other.

On the other hand, the housing 11 is provided with a pair of housing lock portions 41 that are locked to the pair of cover lock portions 33 to hold the cover 13 in a closed state. Each housing lock portion 41 includes an elastic piece 42 that stands upright on the bottom portion 11b of the housing 11 to extend upward, and a lock protrusion 43 that protrudes from the elastic piece 42. The elastic piece 42 is located so as to face the outer surface of the fourth wall portion 24 of the electrical wire housing portion 17 (the side surface of the electrical wire housing portion 17 on the outer side) in the width direction Y. That is, the elastic piece 42 is formed outside the wiring housing portion 11a. An upper end portion of the housing lock portion 41 is elastically deformable in a direction toward or a direction away from the fourth wall portion 24 (i.e. elastically deformable in the width direction Y). The lock protrusion 43 formed on the elastic piece 42 protrudes from the elastic piece 42 toward the fourth wall portion 24. Note that cutouts 11d, which improve the flexibility of the elastic piece 42, are formed in portions of the bottom portion 11b of the housing 11 on both sides of the elastic piece 42 (portions between the elastic piece 42 and restriction wall portions 44 described below).

Figure 5:
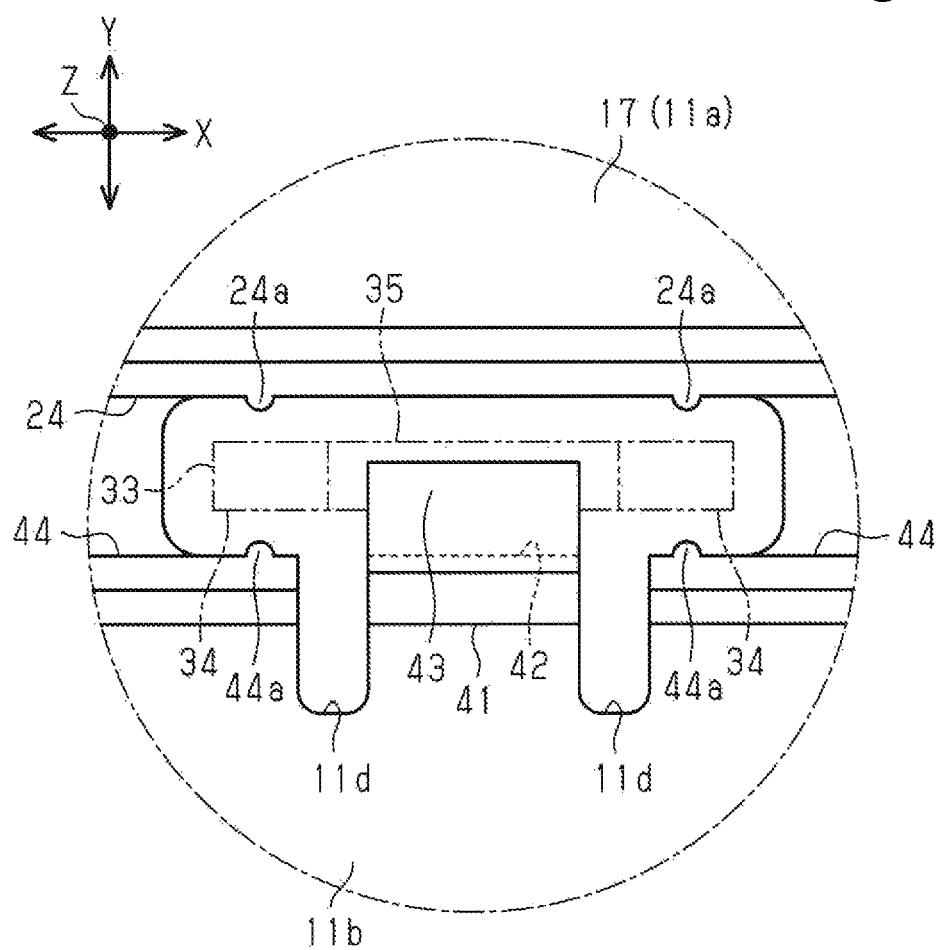
FIG. 5 is a partially enlarged plan view of the battery wiring module according to the embodiment.

Also, as shown in FIGS. 3 and 5, restriction wall portions 44 that stand upright on the bottom portion 11b of the housing 11 so as to extend upward are provided on both sides of each housing lock portion 41 in the depth direction X. As with the housing lock portions 41 (the elastic pieces 42), the restriction wall portions 44 are located so as to face the outer surface of the fourth wall portion 24 of the electrical wire housing portion 17 (the side surface of the electrical wire housing portion 17 on the outer side) in the width direction Y. That is, the restriction wall portions 44 are formed outside the wiring housing portions 11a. The restriction wall portions 44 have the shape of a flat plate extending in the depth direction X (a flat plate shape that is orthogonal to the width direction Y), and are parallel with the fourth wall portions 24. When the cover body portions 32 are at the closed positions, each cover lock portion 33 is inserted into gaps defined by an elastic piece 42, restriction wall portions 44, and a fourth wall portion 24.

Also, as shown in FIGS. 3 and 4, when the cover body portions 32 are in a closed state, the lock protrusions 43 of the housing lock portions 41 abut against the lower end coupling portions 35 of the cover lock portions 33 in the height direction Z. Thus, the cover body portions 32 are restricted from pivoting toward the open positions, and the cover body portions 32 are held at the closed positions.

As shown in FIG. 5, each restriction wall portion 44 is provided with first protruding portions 44a that protrude toward a fourth wall portion 24 in the width direction Y. Each fourth wall portion 24 is provided with second protruding portions 24a that protrude toward a restriction wall portion 44 in the width direction Y. First protruding portions 44a are provided on both sides of each housing lock portion 41 in the depth direction X. The second protruding portions 24a are located so as to respectively face the first protruding portions 44a. In the width direction Y, the protruding leading ends of the first protruding portions 44a are located closer to the fourth wall portions 24 than the elastic pieces 42 of the housing lock portions 41 are. Also, when the covers 13 are in a closed state, that is, when the cover lock portions 33 are in the state of being locked to the housing lock portions 41, each of the extension portions 34 of the cover lock portions 33 is located between first protruding portions 44a and second protruding portions 24a that face each other in the width direction Y.

Next, the following describes actions of the present embodiment.

As shown in FIG. 4, the elastic piece 42 of each housing lock portion 41 is located so as to face the outer surface of a fourth wall portion 24, which is a side wall that defines a wiring housing portion 11a (i.e. located outside the wiring housing portion 11a). Each cover lock portion 33 is locked to the lock protrusion 43 of a housing lock portion 41, in the state of being inserted between a fourth wall portion 24 and an elastic piece 42. That is, the housing lock portions 41 are locked to the outer sides of the cover lock portions 33 (the sides that are located farther from the wiring housing portions than the other sides are) of the cover lock portions 33. Therefore, it is easier to touch the housing lock portions 41 from above the covers 13, and it is easier to unlock the housing lock portions 41 from the cover lock portions 33 by performing an operation from above the covers 13 to elastically deform the housing lock portions 41.

When located at the closed positions, the covers 13 may be displaced in the width direction Y due to an external force being applied thereto. If a cover 13 is displaced inward in the width direction Y, the lower end coupling portions 35 of the cover lock portions 33 move toward the elastic pieces 42 of the housing lock portions 41. At this time, in the present embodiment, the extension portions 34 of the cover lock portions 33 respectively abut against the first protruding portions 44a of the restriction wall portions 44 so that the cover 13 is restricted from moving. With this configuration, it is possible to prevent the lower end coupling portions 35 of the cover lock portions 33 and the lock protrusions 43 of the housing lock portions 41 from being unlocked from each other due to the cover lock portions 33 moving in the width direction Y toward the housing lock portions 41 (the elastic pieces 42).

If a cover 13 is displaced outward in the width direction Y, the lower end coupling portions 35 of the cover lock portions 33 move in the direction that is the same as the direction in which the lock protrusions 43 protrude. At this time, the extension portions 34 of the cover lock portions 33 abut against the second protruding portions 24a of the fourth wall portion 24, and thus the cover 13 is restricted from moving. With this configuration, it is possible to prevent the lower end coupling portions 35 of the cover lock portions 33 and the lock protrusions 43 of the housing lock portions 41 from being unlocked from each other due to the covers 13 being displaced. Of course, the lower end coupling portions 35 and the lock protrusions 43 are designed such that sufficiently large locking margins can be secured therebetween when the extension portions 34 of the cover lock portions 33 are in the state of abutting against the second protruding portions 24a.

Next, the following describes the effects of the present embodiment.

Each housing lock portion 41 includes an elastic piece 42 that is located so as to face the outer surface (the surface outside a wiring housing portion 11a) of a side wall (a fourth wall portion 24) that defines the wiring housing portion 11a, and is deformable in a direction toward and a direction away from the fourth wall portion 24, and a lock protrusion 43 that protrudes from the elastic piece 42 in the direction toward the fourth wall portion 24. Each cover lock portion 33 is locked to a lock protrusion 43, in the state of being inserted between a fourth wall portion 24 and an elastic piece 42. With this configuration, the housing lock portions 41, each including an elastic piece 42 and a lock protrusion 43, are locked to the outer sides of the cover lock portions 33 (the sides that are located farther from the wiring housing portions than the other sides are) of the cover lock portions 33. Therefore, it is easier to touch the housing lock portions 41 from above the covers 13, and it is easier to unlock the housing lock portions 41 from the cover lock portions 33 by performing an operation from above the covers 13 to elastically deform the housing lock portions 41. Thus, it is possible to improve workability when the covers 13 are to be opened.

The housing 11 is provided with the restriction wall portions 44 that face the outer surfaces of the fourth wall portions 24, and the restriction wall portions 44 restrict the cover lock portions 33 from moving away from the fourth wall portions 24. Therefore, when an external force is applied to a cover 13, the elastic pieces 42 of the housing lock portions 41 are pressed by the cover lock portions 33 in a direction away from the fourth wall portion 24 and elastically deform. Thus, it is possible to prevent the lock protrusions 43 of the housing lock portions 41 and the cover lock portions 33 from being unintentionally unlocked from each other.

Each restriction wall portion 44 is provided with first protruding portions 44a that protrude toward a fourth wall portion 24. Thus, when the cover lock portions 33 come into contact with the restriction wall portions 44 due to a dimension error or the like, the restriction wall portions 44 come into contact with the cover lock portions 33 at the first protruding portions 44a. Therefore, it is possible to reduce the contact area between the cover lock portions 33 and the restriction wall portions 44. Consequently, it is possible to reduce resistance (a frictional force) that is generated when the covers 13 are opened and closed, as much as possible.

The fourth wall portions 24 restrict the cover lock portions 33 from moving in the direction in which the lock protrusions 43 protrude. Thus, when an external force is applied to a cover 13, it is possible to prevent the lock protrusions 43 of the housing lock portions 41 and the cover lock portions 33 from being unintentionally unlocked from each other.

Each fourth wall portion 24 is provided with second protruding portions 24a that protrude toward cover lock portions 33 that are in the state of being locked to housing lock portions 41. Thus, when the cover lock portions 33 come into contact with the fourth wall portions 24 of the wiring housing portions 11a due to a dimension error or the like, the fourth wall portions 24 come into contact with the cover lock portions 33 at the second protruding portions 24a. Therefore, it is possible to reduce the contact area between the cover lock portions 33 and the fourth wall portions 24. Consequently, it is possible to reduce resistance (a frictional force) that is generated when the covers 13 are opened and closed, as much as possible.

The above-described embodiment may be modified as follows.

The number and arrangement of the cover lock portions 33 and the housing lock portions 41 according to the above-described embodiment are examples, and may be modified as appropriate.

The cover lock portions 33 do not necessarily have a substantially U-like frame shape. For example, protruding portions that protrude toward the elastic pieces 42 from extension portions that extend from the cover body portions 32 may be provided so that the protruding portions are locked to the housing lock portions 41.

In the above-described embodiment, the covers 13 are formed integrally with the housing 11. However, the present invention is not limited to such a configuration. The housing 11 and the covers 13 may be separately molded, and the separate covers 13 may be attached to the housing 11 so as to be pivotable. Also, the material of the housing 11 and the covers 13 is not necessarily resin, and any material may be used as long as the wiring 12 (the bus bars 14 and the electrical wires 15) can be reliably insulated.

The restriction wall portions 44 may be omitted from the housing 11 according to the above-described embodiment. Also, although the fourth wall portions 24 are located so as to be able to restrict the cover lock portions 33 from moving in the direction in which the lock protrusions 43 protrude, the present invention is not limited to such a configuration. The fourth wall portions 24 may be located so as not to be able to restrict the cover lock portions 33 from moving in the direction.

The number and arrangement of the bus bar housing portions 16 and the electrical wire housing portions 17 in the wiring housing portions 11a according to the above-described embodiment are examples, and may be modified as appropriate. For example, in the above-described embodiment, the electrical wire housing portions 17 are provided on the inner side of the bus bar housing portions 16 in the width direction Y. However, the present invention is not limited to such a configuration, and the electrical wire housing portions 17 may be provided on the outer side of the bus bar housing portions 16 in the width direction Y. Also, for example, a plurality of the same or similar battery wiring modules 10 may be coupled to each other in the depth direction X and used as an integrated module.

In the above-described embodiment, the present design is applied to the covers 13 that cover the bus bar housing portions 16 of the wiring housing portions 11a and the electrical wire housing portions 17 all at once. However, this is not essential, and the present design may be applied to covers that only cover the electrical wire housing portions 17, or covers that only cover the bus bar housing portions 16.

The above-described embodiment and modifications may be combined as appropriate.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10: Battery Wiring Module
11: Housing
11a: Wiring Housing Portion
12: Wiring
13: Cover
24: Fourth Wall Portion (Side Wall of Wiring Housing Portion)
24a: Second Protruding Portion
32: Cover Body Portion
33: Cover Lock Portion
41: Housing Lock Portion
42: Elastic Piece
43: Lock Protrusion
44: Restriction Wall Portion
44a: First Protruding Portion
B: Secondary Battery

What is claimed is:

1. A battery wiring module comprising:
    wiring that is to be electrically connected to an on-board secondary battery;
    a housing that is to be attached to the secondary battery and includes a wiring housing portion that houses the wiring; and
    a cover that includes a cover body portion that is coupled to the housing so as to be pivotable between a closed position at which the cover body portion closes an opening of the wiring housing portion and an open position at which the cover body portion does not close the opening, and a cover lock portion that extends from the cover body portion and is locked to a housing lock portion when the cover body portion is at the closed position, the housing lock portion being provided on the housing,
    wherein the housing lock portion includes an elastic piece that is located so as to face an outer surface of a side wall of the wiring housing portion, and is elastically deformable in a direction away from and a direction toward the side wall, and a lock protrusion that protrudes from the elastic piece in the direction toward the side wall, and
    the cover lock portion is locked to the lock protrusion in a state of being inserted between the side wall and the elastic piece, wherein the side wall restricts the cover lock portion from moving in a direction in which the lock protrusion protrudes.

2. The battery wiring module according to claim 1,
    wherein the housing is provided with a restriction wall portion that faces an outer surface of the side wall,
    the cover lock portion is located between the side wall and the restriction wall portion when the cover lock portion is in a state of being locked to the lock protrusion, and
    the restriction wall portion restricts the cover lock portion from moving in a direction to deform the elastic piece in the direction away from the side wall.

3. The battery wiring module according to claim 2,
    wherein the restriction wall portion is provided with a first protruding portion that protrudes toward the side wall.

4. The battery wiring module according to claim 1,
    wherein the side wall is provided with a second protruding portion that protrudes toward the cover lock portion that is in a state of being locked to the housing lock portion.

* * * * *